UNITED STATES PATENT OFFICE.

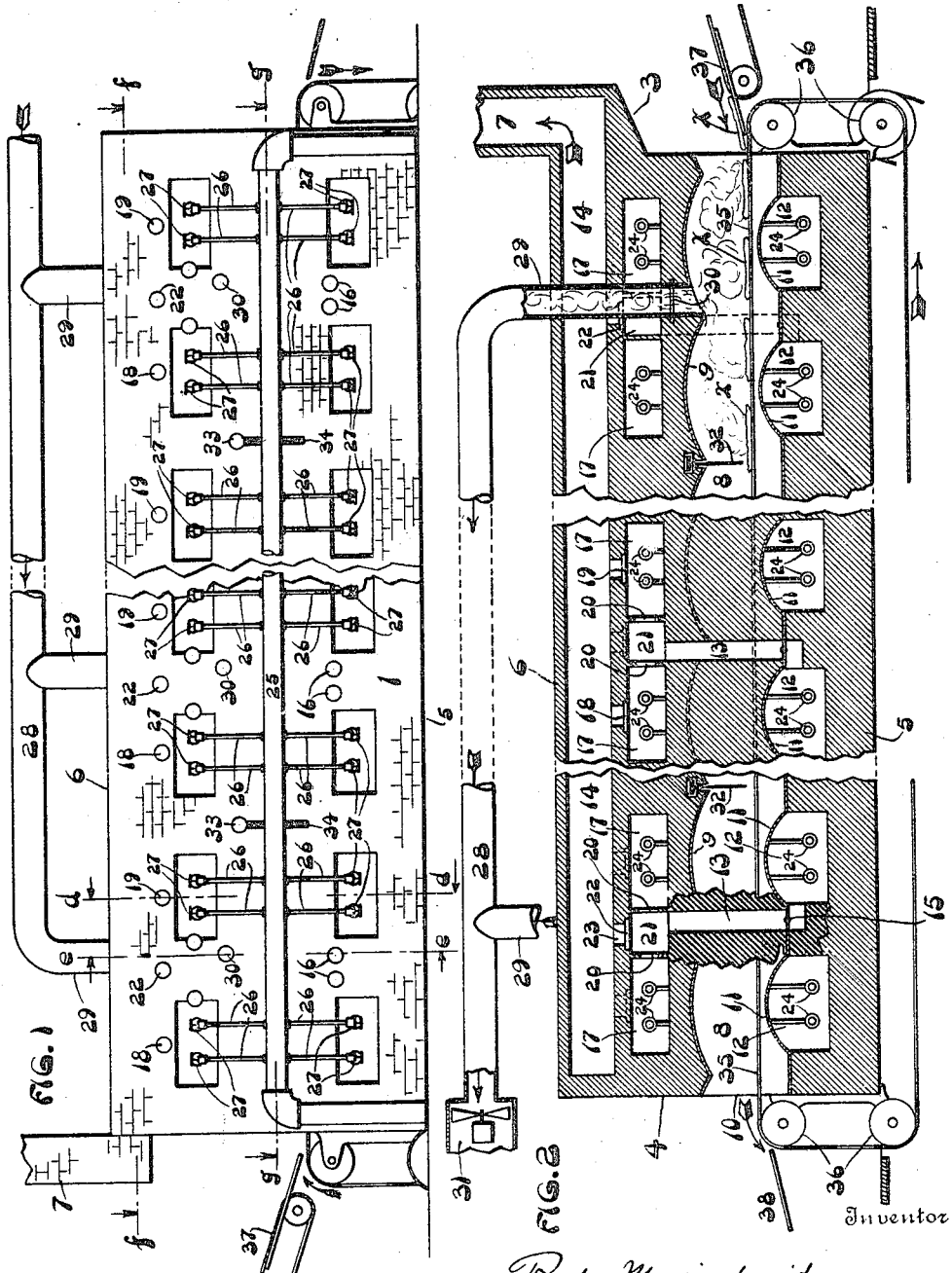

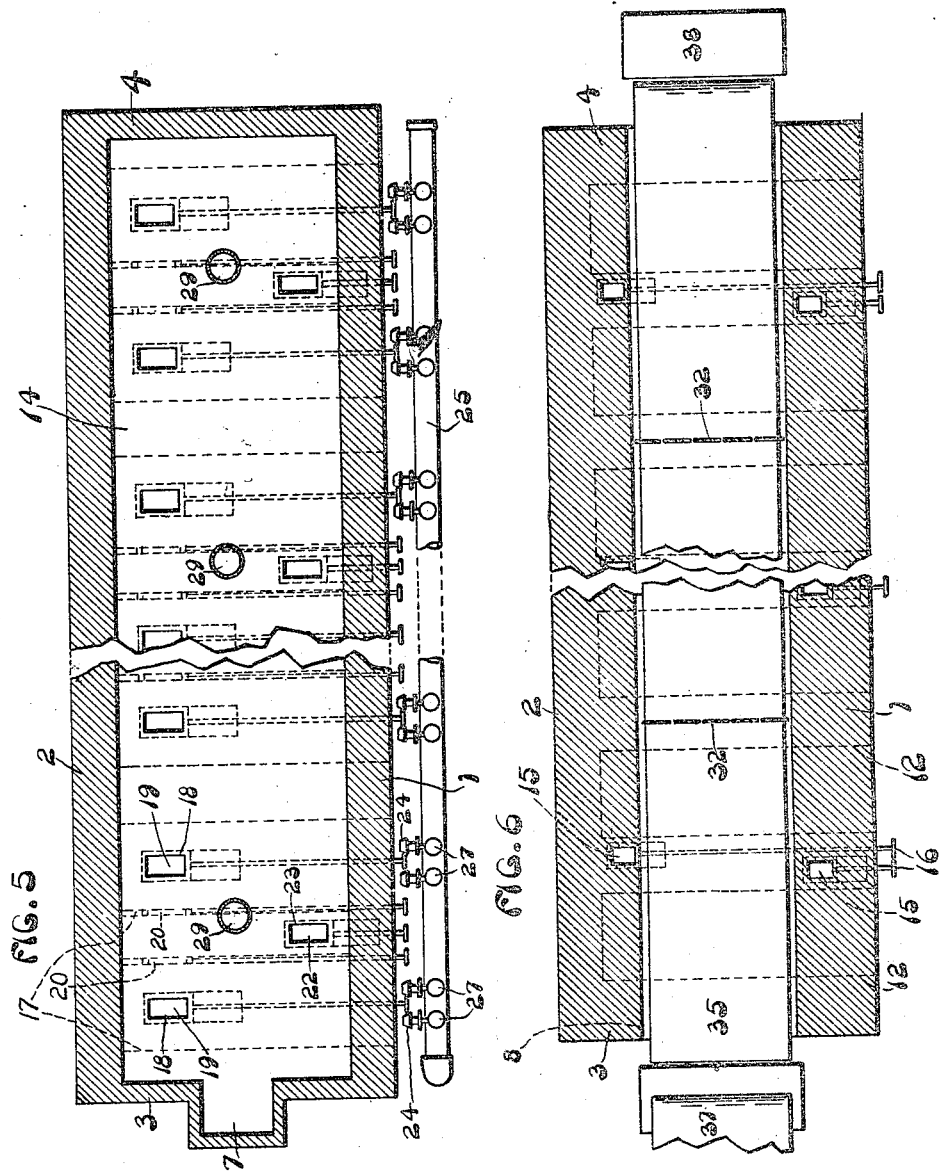

BEHR MANISCHEWITZ, OF CINCINNATI, OHIO; JACOB URIAH MANISCHEWITZ, JOSEPH MANISCHEWITZ, AND MAX MANISCHEWITZ, EXECUTORS AND TRUSTEES OF SAID BEHR MANISCHEWITZ, DECEASED.

BAKE-OVEN.

1,169,555.      Specification of Letters Patent.     Patented Jan. 25, 1916.

Application filed October 28, 1911. Serial No. 657,331.

*To all whom it may concern:*

Be it known that I, BEHR MANISCHEWITZ, a citizen of the United States of America, and a resident of Cincinnati, in the county of Hamilton and State of Ohio, have invented a certain new and useful Improvement in Bake-Ovens, of which the following is a specification.

This invention relates to the class of bake-ovens for matzos (unleavened bread), crackers, bread, cakes and other similar bakery goods having a traveling apron or carrier device that conveys the said class of food products to be baked within the oven, from the receiving-point to the discharge-point, and it has for its object the following-named list of advantageous features: The employment or provision of iron or other similar readily heated and radiating metal for a traveling-carrier oven, which iron or other metallic substance is used instead of the customary fire-brick or fire-tile, either of which latter very slowly heats and cools and does not radiate its heat as readily or effectually as does said metallic substance, nor does either said brick or tile present the same economy in the manufacture and use of a bake-oven of the class referred to; the separate, distinct and independent firing and heating means for either or both the top and bottom of the oven, to maintain uniform heat and corresponding uniform baking; the peculiar means of ventilation of the oven, whereby the required volume of heat and the liberation of vapors or moisture is held under due control in the several sections or chambers provided in the length of the oven by the employment of one or more transverse partitions in the baking-chamber and whereby the goods are uniformly baked as they advance from the receiving-point toward the discharge-point; and the employment or provision, in a traveling-carrier bake-oven, of a longitudinal series of transverse roof and floor arches, each of which curves at right-angles to the length of the oven instead of being one continuous, longitudinal plain arch and flat plane floor, whereby the oven is held under more certain and delicate control, to secure the desired uniformity and conformity of heat throughout the length and width thereof, all of which features are useful in producing goods that are evenly and properly baked and avoid the necessity of sorting out any improperly baked goods, such latter defect noticeably and materially existing in other structures of bake-ovens as heretofore made.

The invention consists in certain novel features of arrangement and construction of parts that will be fully described hereinafter and then particularly pointed out in the claims.

Figure 3:
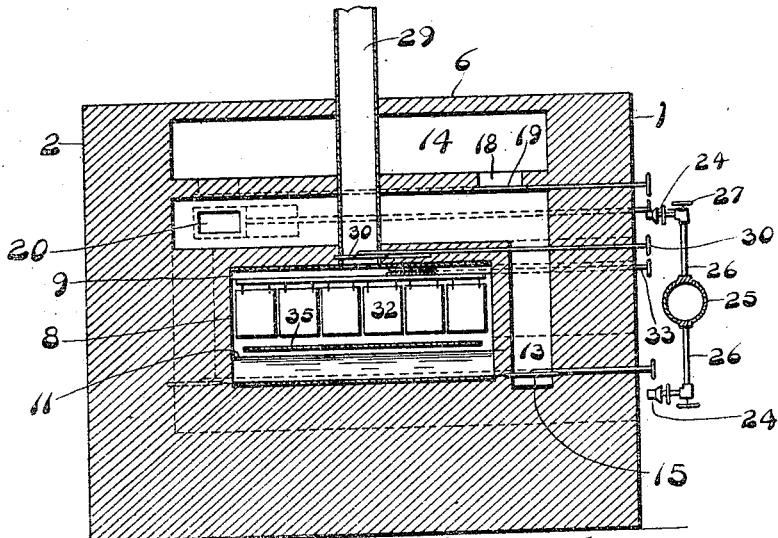
Figure 4:
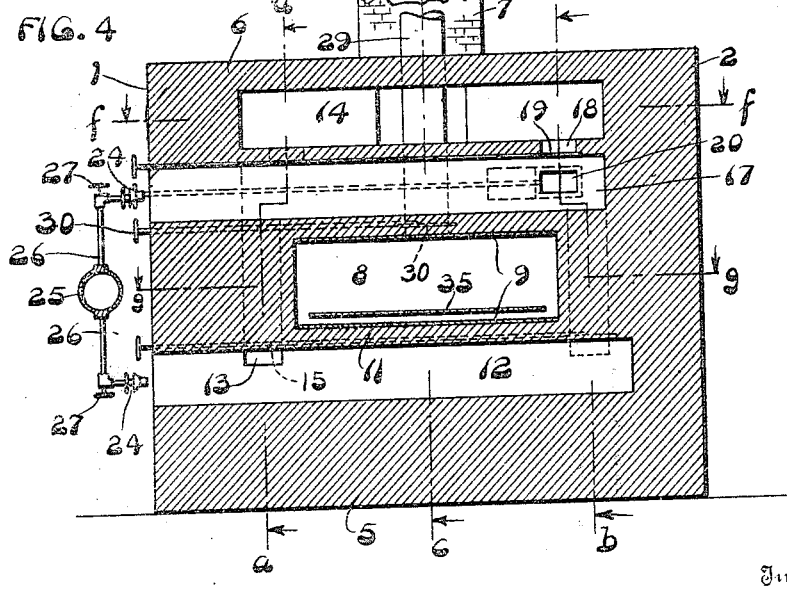

In the accompanying sheets of drawings, Figure 1 is a longitudinal elevation (broken out between ends) of my invention; Fig. 2, a longitudinal section, (broken out at several points between ends, but the reverse of Fig. 1) taken on three different, vertical dotted-lines, viz. $a$, $a$ of Fig. 4, $b$, $b$ of said Fig. 4, and $c$, $c$ of said Fig. 4, to illustrate the internal structure of the oven at different points in its length; Fig. 3, a transverse section taken on the dotted-line $e$, $e$ of Fig. 1; Fig. 4, a transverse section taken on the dotted-line $d$, $d$ of Fig. 1; Fig. 5, a sectional plan taken on the dotted-line $f$, $f$ of Figs. 1 and 4; and Fig. 6, a sectional plan taken on the dotted-line $g$, $g$ of said Figs. 1 and 4, the same being on a line with the horizontal center of the baking-chamber and showing the traveling-carrier for supporting the goods while baking.

1 and 2 indicate the respective longitudinal front and rear brick walls; 3 the receiving-end brick wall; 4 the discharge-end brick wall; 5 the brick bottom of the structure and 6 the brick or like top of said structure.

7 indicates the main exit-flue or chimney for the discharge of heat and gas from the oven and to induce draft under suitable control that will be hereinafter referred to.

8 indicates the baking-chamber whose surface is composed of a longitudinal series of transverse upper metal arches 9 forming the roof, metal sides 10 and a longitudinal series of lower metal arches 11, forming the bottom all as best seen in Fig. 2. It is important and preferable herein to make the inner surface of the oven, whether arched or flat, of iron, because that substance readily heats and cools and, besides, it radiates the heat for baking purposes to better advantage than any other material and, at the same time, it is somewhat more economical to manufacture and handle, and to subsequently repair or maintain in use.

12 indicates each one of a longitudinal series of transverse firing-chambers located beneath the baking-chamber 8, at suitable intervals apart and each one provided with a vertical elbowed-flue 13 leading to the horizontal main-flue 14, the latter being located at the top of the oven-structure and leading to the exit-flue or chimney 7, all as best seen in Fig. 2. Regulating-dampers 15 are provided in the vertical up-flues 13 and have suitable handled-ends 16 conveniently located along the outer face of the oven-wall 1.

17 indicates each one of a longitudinal series of transverse firing-chambers located at suitable distances apart above the baking-chamber 8, preferably in due vertical alinement with the lower firing-chambers 12 and each provided with a short vertical up-flue 18 controlled by regulating-dampers 19 and, also, provided with short lateral flues 20 leading to a common transverse flue 21 that is provided with a regulating-damper 22 that closes the outlet 23 that leads into the main-flue 14. The short flues or outlets 18 for the direct upward escape of heat and gases from the upper firing-chambers 17 lead to the main-flue 14 and are shown in unbroken as well as in dotted lines in Fig. 2. The main-flue 14 extends across the entire top of the oven-structure so as to be reached by all of the exit or uptake flues from below, as best seen in Fig. 5.

The firing-chambers 12 and 17 are each provided with a double set of gas-burners 24 that receive their supply of gas or burning-fluid from the main supply-pipe 25 horizontally arranged along the front face 1 of the oven-structure and provided with vertical extensions or branches 26, the latter duly supporting said burners so that their jets of flame shall project into the said firing-chambers 12 and 17, respectively, and that the flame from the lower burners shall radiate upwardly toward the bottom of the baking-chamber and that the flame from the upper burners shall radiate downwardly toward the top or roof of the baking-chamber, so as to duly direct and concentrate the heat where it shall prove most effective in the operation of the oven. The burners are all supplied with suitable regulating-valves 27 whereby the original source of heat for the oven is initially held under due control, from the receiving-end of the oven to the discharge-end thereof, and the uniform baking of the goods properly provided for. It is obvious that any other source of heat supply can be provided in the firing-chambers 12 and 17, and I do not wish to be confined to the use of gas-burners only, but which gas-burner system I have shown herein as it is the most convenient form now at hand.

28 indicates a horizontal steam or moisture exit-flue having vertical pendent branches 29 leading to the top or roof of the transversely-arched baking-chamber 8 and provided with controlling-dampers 30, the latter having suitable handles conveniently arranged on the outside of the front wall 1 whereby the vapor or steam arising from the moisture in the goods passes or escapes, preferably, but not essentially, under due regulating-control into the atmosphere through the suction-fan controlled exit 31, all as best seen in Fig. 2.

32 indicates each one of a longitudinal series of transverse partitions arranged in the baking-chamber 8, at suitable distances apart to divide said baking-chamber into a number of distinct baking-sections that are adapted to progressively vary in heat or temperature from the receiving-end of the baking-chamber to the discharge-end thereof, to suit the position of the goods in the advancing course of their baking-operation. These partitions 32 are each preferably made up of a series of vertical plates pivotally supported by means of a horizontal rod 33 that leads to the outer face of the front wall 1 and has a convenient handle for use in drawing the said pivotally-held plates outwardly through the vertical slots 34 made in the wall 1, whereby two or more baking-sections can be thrown into one. These partitions are useful, too, when it is desired to provide an unobstructed passage of greater or less width between baking-sections, and when it is desired to permit objects to pass beneath that will not otherwise clear the lower edges of said hinged or pivotally-held metal plates. The goods $x$ normally and ordinarily clear the lower yielding edges of said pivotally-held plates without injury when passing along on the traveling apron or carrier 35, the latter being an endless one, as customary, and made up of wire cloth, or metal plates or bars, as desired, that are mounted on drums or rolls 36 that are suitably driven by a power device. The partitions 32 can obviously be made stationary and of a single piece of material if desired.

At the fore or receiving end 3 of the baking-chamber I provide an automatic feed device 37, of any suitable construction and not herein shown in detail but preferably used in the operation of my device for the better conduct of the goods into position for the baking process or operation. A suitable discharge-table 38 is provided at the rear or discharge end of the baking-chamber, such table being placed closely adjacent but not touching the traveling apron or carrier as it rides over the upper one of the drums or rolls 36 at the rear end of the oven-structure.

The longitudinal series of transverse upper and lower arches in the baking-chamber provide better control of the heat and gases within said baking-chamber at different points along the route or passage of the goods in the baking process, and the separate and distinct firing of the upper and lower burner or firing chambers, also provides for the due control of the heat on both the top and bottom of the baking-chamber. Besides, the thorough system of ventilation, controlled by the dampers that are best shown in Figs. 1, 2 and 3, and described in detail, provides for the due escape of steam or moisture from each and every baking-section of the chamber 8, so that the goods are properly acted upon by the duly controlled heat and thereby uniformly baked and browned to suit the will of the baker and the demands of the trade and the user.

I have referred to the use of iron or other similar metallic substance for the baking-chamber and the traveling apron or carrier and have stated at the beginning of this specification why I prefer the use of such material, instead of using fire-brick or fire-tile, and I do not deem it necessary to refer to any further details in connection therewith at this point, except to emphasize its employment in the building and operation of a traveling-carrier bake-oven, although it (iron) is not conclusively nor exclusively essential to the form of structure otherwise herein.

I claim:—

1. A traveling-carrier bake-oven for matzos, crackers, bread, cakes and like bakery goods comprising suitable main walls, a longitudinal series of transverse, independently-partitioned firing-chambers within said main-walls, and a longitudinal tunneled baking-chamber provided within said main-walls and composed of an independent tunneled iron structure that is arranged in heating-relation with said firing-chambers.

2. A traveling-carrier bake-oven comprising suitable main-walls, a longitudinal tunneled baking-chamber, and a longitudinal series of transverse independent firing-chambers arranged in connection with the upper face of said tunneled baking-chamber.

3. A traveling-carrier bake-oven comprising suitable main-walls, a longitudinal tunneled baking-chamber arranged and supported within said walls and composed of a metallic substance, and a longitudinal series of transverse independent firing-chambers arranged in connection with both the upper and lower faces of said tunneled baking-chamber.

4. A traveling-carrier bake-oven comprising main-walls, a longitudinal series of transverse upper and lower firing-chambers within said walls, and a longitudinal tunneled baking-chamber arranged between said upper and lower series of firing-chambers and having a longitudinal continuous series of transverse upwardly-disposed or convex roof-arches.

5. A traveling-carrier bake-oven comprising outside walls, a longitudinal series of transverse firing-chambers arranged within said walls, and a longitudinal tunneled baking-chamber also arranged within said walls and having a longitudinal continuous series of transverse convex floor-arches.

6. A traveling-carrier bake-oven comprising outside walls, a longitudinal series of transverse firing-chambers arranged within said walls, and a longitudinal tunneled baking-chamber also arranged within said walls and having a longitudinal continuous series of transverse upwardly-disposed or convex roof and floor arches composed of iron therein.

7. A traveling-carrier bake-oven comprising supporting or housing walls, a longitudinal series of upper transverse firing-chambers, a longitudinal series of lower transverse firing-chambers, a longitudinal tunneled baking-chamber extending from the receiving-end of the oven to the discharge-end thereof but intervening said upper and lower series of transverse firing-chambers, a main-flue in the oven leading to an exit-chimney, damper-regulated heat exit-flues leading from said upper firing-chambers to said main-flue, damper-regulated heat exit-flues leading from said lower firing-chambers to said main-flue in the oven, and transverse swinging partitions arranged in said baking-chamber.

8. A traveling-carrier bake-oven comprising supporting main-walls, a longitudinal series of transverse independent firing-chambers arranged and supported within said walls, a longitudinal tunneled metallic baking-chamber arranged and supported within said walls, and steam or moisture exit-flues leading from said baking-chamber.

9. A traveling carrier bake-oven comprising supporting main-walls, a longitudinal series of transverse upper firing-chambers, a longitudinal series of transverse lower firing-chambers, a longitudinal tunneled baking-chamber intervening said upper and lower series of firing-chambers, and suitably regulated steam or moisture exit-flues arranged in said baking-chamber.

10. A traveling-carrier bake-oven comprising supporting main-walls, a longitudinal tunneled baking-chamber, a longitudinal series of upper transverse firing-chambers having suitable heat-radiating surfaces, and a longitudinal series of lower transverse firing-chambers having suitable heat-radiating surfaces and both said heat-radiating surfaces being adapted to radiate into said longitudinal tunneled baking-chamber.

BEHR MANISCHEWITZ.

Witnesses:
JOHN ELIAS JONES,
LORETTA LUCK.

Copies of this patent may be obtained for five cents each, by addressing the "Commissioner of Patents, Washington, D. C."